Figure 1:
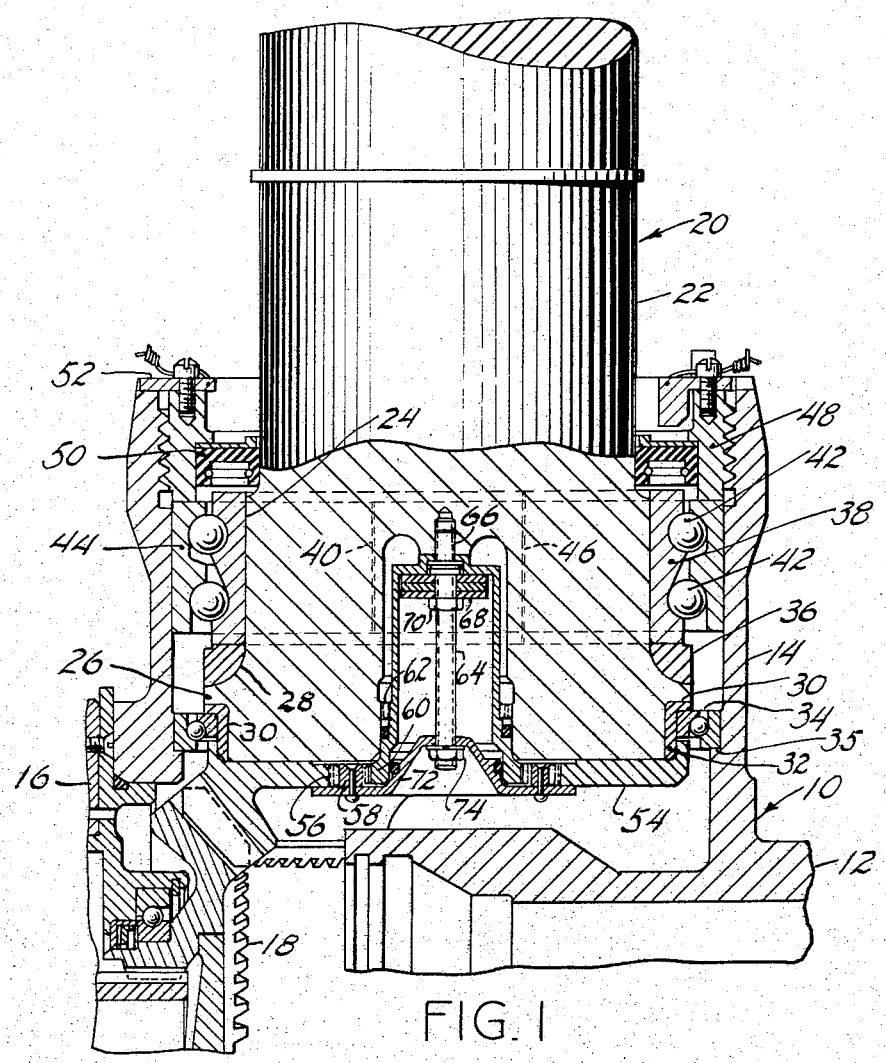

Sept. 20, 1955　　　M. E. CUSHMAN　　　2,718,268

PROPELLER BLADE RETENTION RING ASSEMBLY

Filed Sept. 29, 1952

INVENTOR
MAURICE E. CUSHMAN
BY *Godfrey B. Spicer*
ATTORNEY

United States Patent Office 2,718,268
Patented Sept. 20, 1955

2,718,268

PROPELLER BLADE RETENTION RING ASSEMBLY

Maurice E. Cushman, Verona, N. J., assignor to Curtiss-Wright Corporation, a corporation of Delaware Application September 29, 1952, Serial No. 311,982

1 Claim. (Cl. 170—160.58)

This invention relates to variable pitch aeronautical propellers and more particularly, to arrangements for retaining the blades in the hubs of such propellers.

An object of the invention is to provide improvements in the arrangements for securing a propeller blade in a hub, and to provide a blade retention means whereby propeller blades of relatively soft material may be effectively secured to anti-friction bearing races of very hard material, with optimum stress distribution therebetween.

The invention in some respects comprises improvements in the propeller blade mounting arrangements shown in Sheets Patent No. 2,436,612 and in Sheets and Cushman Patent No. 2,499,837.

Figures 2, 3:
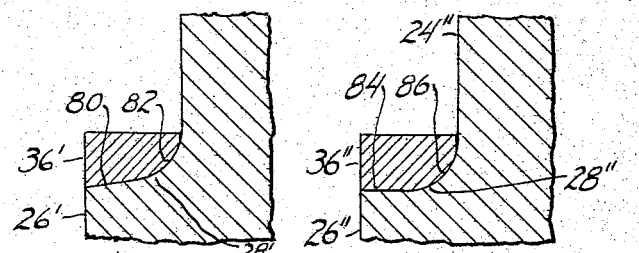

For a detailed understanding of the invention, reference may be made to the following detailed description which should be read in connection with the drawing in which:

Fig. 1 is a longitudinal section through a propeller blade-propeller hub mounting, Fig. 2 is a fragmentary section of an alternative arrangement of part of Fig. 1, Fig. 3 is a fragmentary section of another alternative arrangement of a part of Fig. 1.

Referring to Fig. 1, I provide a propeller hub 10 comprising a portion 12 adapted to engage a propeller shaft, not shown, in the usual manner. As an integral part of the hub, a plurality of blade sockets are provided, one of which is indicated at 14. The outboard or left end of the hub 10 as shown is provided with a blade changing mechanism, a portion of which is shown at 16 and includes a master bevel gear 18.

A propeller blade 20 is mounted in the hub socket 14, the blade of this invention comprising preferably a solid member of non-ferrous material such as aluminum alloy. The shank portion of the blade is shown at 22 and is of generally cylindrical form and blends at its outer or upper end in well known fashion into a flattened airfoil-shaped blade. The inner end of the shank 22 blends into a carefully machined cylindrical portion 24 slightly larger in diameter than the shank 22, the inner end of the portion 24 being formed as an integral flange 26 extending radially outwardly beyond the portion 24, the flange being filleted to the portion 24 by a curved fillet 28. A step 30 is formed in the hub end of the flange 26 to accommodate an adapter 32 provided with a step to which is fitted a preload ball bearing 34, the outer race of which fits within the cylindrical bore of the socket 14 and upon a step 35 in the socket.

Around the shank portion 24 and seating upon the upper face (as shown) of the flange 26, is a continuous metallic ring 36, preferably of soft steel, the lower face of the ring 36 being complementary in shape to the upper filleted surface 28 of the flange 26. The upper surface of the ring 36 is flat, and lies in a plane normal to the propeller blade axis. The ring 36 provides a firm flat seat upon which the inner race 38 of the multiple row ball bearing is engaged. The inner race 38 is split as at 40 so that the halves thereof may be assembled around the shank portion 24 into close fitting engagement therewith.

Bearing balls 42, in suitable retainers, are assembled in the several grooves of the bearing race 38 after which a multiple groove outer bearing race 44 is assembled around the balls and the inner race. The outer race 44, like the inner race 38, is split as at 46 to enable its assembly around the balls. The outer surface of the outer race 44 is carefully machined to fit within the bore of the blade socket 14, and the entire blade and bearing assembly is secured within the socket 14 by means of a retention nut 48 screwed into the outer end of the socket. A composition seal 50 is engaged between the nut 48 and the blade shank 22 to prevent the entry of dust into the bearing and to prevent the issue of lubricant, contained within the hub, from the blade socket. The retention nut 48 is locked in the socket 14 against turning by a locking lug 52, in conventional manner.

At the inner end of the blade, and secured thereto, is a blade gear element 54 which engages the gear 18 whereby pitch changing movement is transmitted from the gear 18 to the blade. The gear 54 includes splines 56 engaged with an internally and externally splined element 58, the inner splines of which engage external splines on a member 60 which is secured within a bore in the butt of the blade 20. Splines 62 on the blade and member 60 secure these two members against relative rotation. A stud 64, screwed into the material of the propeller blade at 66, provides for retention of the member 60 in the blade and also provides means for inserting balancing washers 68 in the member 60, the assembly being secured by a nut 70 engaging the stud 64.

The stud 64 projects inwardly as shown to pass through a plate 72 forming part of the internally and externally splined member 58. The plate is secured to the propeller blade by a nut 74 engaging the stud 64. The splines on the outside and inside of the member 58 are different in number and correspond with the co-acting splines of the members 54 and 60 whereby the gear 54 may be indexed in its rotational position with respect to the blade 20 to secure the proper angular relationship between the gear and the airfoil portion of the propeller blade.

As shown in Fig. 1, the bearing surface between the blade flange 26 and the continuous ring 36 is in the form of the large curved fillet 28. Fig. 2 shows the configuration of this bearing surface in alternative form wherein the outer upper portion of the flange 26' as at 80 is conic in form, the conic ledge blending into a curved fillet portion 82 which in turn blends into the shank portion 24'. The ring 36' is formed to fit the surfaces 80 and 82.

In Fig. 3, the configuration of the bearing surface 28" on the flange 26" includes a plane outer ledge 84 blending into a curved fillet portion 86 which in turn blends into the cylindrical shank portion 24". The ring 36" is formed to fit the surfaces 84 and 86. In all the figures, the inner diameter of the ring 36 is slightly larger than the diameter of the shank portion 24 for a purpose to be described.

The relatively soft material of the blade shank and flange is blended to the hard material of the inner bearing race 38 by means of the unhardened ferrous ring 36 to enable effective transmission of blade stresses to the bearing race. If desired, a thin gasket or coating of composition material may be inserted between the blade flange 26 and the ring 36 to minimize galling of the parts.

In the construction of the blade shank assembly, the propeller blade usually comprises a straight shank forging. Over the shank end of the forging, the ring 36 is assembled whereupon the blade shank is processed in an upsetting machine to form the flange 26. The flange is then machined to conform to the desired external form whereupon the ring 36 is passed downwardly over the shank to fit with and engage the flange. Thereafter, the bearing races are assembled and the blade is secured in the propeller. It will be realized that the upsetting operation for the blade flange is usually accomplished with the blade hot. Since the ring 36 is not critical in respect to hardness and is not materially affected by high temperatures, the blade upsetting operation can be accomplished without danger to the heat treatment of the elements involved. Thereafter, the hard split bearing races 38 and 44 may be assembled in the cold condition. If an inner bearing race in the form of a complete ring were sleeved over the blade shank before upsetting of the flange 26, elaborate precautions would be necessary to protect the race from the heat required for upsetting to prevent softening of the very hard race. Through use of the ring 36, such elaborate insulation becomes unnecessary.

Clearance is allowed between the rings 36, 36' and 36", and the shanks 24, 24' and 24" respectively so that the rings may be readily assembled before the shank is upset and so that they may be readily passed downwardly against the flange 26 after the blade shank and flange have been machined. Also, clearance may be allowed between the bearing race 38 and the shank portion 24 for insertion of a gasket, or plating, to minimize galling. Transmission of load from the blade to the ring 36 occurs predominantly in the area covered by the fillet 28. It is preferred that the fillet radius on the ring 36 be made slightly smaller than the fillet radius on the blade shank.

The blade retention arrangement herein described enables the fabrication and assembly of a propeller with minimum bulk and weight and thus possesses advantages over the structures of the prior art. The invention also enables effective utilization of multiple-row anti-friction bearings to assume the high centrifugal loading between the blade and socket.

Though several embodiments illustrating the invention have been shown and described, it is to be understood that the invention may be applied in various forms. Changes may be made in the arrangements, without departing from the spirit of the invention. Reference should be had to the appended claim for definitions of the limits of the invention.

What is claimed is:

In a variable pitch propeller, a ferrous hub having an integral annular blade socket, including a cylindrical bore and internal threads at the outer end thereof, a light alloy non-ferrous blade, said blade having a cylindrical butt portion entering said hub socket, having an outer integral blade portion of transversely greater dimension than the diameter of said butt portion, and having an integral annular flange at the inner end of said butt portion, the juncture between said flange and butt portion comprising a curved annular fillet of a radius substantially as great as the width of said flange; namely, substantially equal to the difference in radius of said flange and butt portion; a one-piece continuous annular spacer ring of ferrous material which is harder and stronger than the blade material, embracing said cylindrical butt between said flange and said outer integral blade portion, said ring having an inside diameter substantially the same as and in loose fitting engagement with said butt portion, having a cylindrical outer surface of substantially the same diameter as said flange, having a flat upper surface normal to the blade axis and having a curved lower and inner surface comprising a chamfered part complementary in shape and in fitting engagement with said curved annular fillet between the flange and butt portion, a longitudinally split, two-part ferrous inner ball race embracing said cylindrical butt and having a planar inner end in fitting engagement with the flat upper surface of said ferrous ring, a longitudinal split two-part outer ferrous ball race embracing said inner race and fitted within said socket and engaging the cylindrical wall thereof, bearing balls between said inner and outer races, and nut means engaging said socket threads and the outer end of said outer race to secure the races and blade within said hub socket.

References Cited in the file of this patent

UNITED STATES PATENTS

| | | |
|---|---|---|
| 1,921,883 | Horger | Aug. 8, 1933 |
| 2,318,486 | Hoover | May 4, 1943 |
| 2,499,837 | Sheets et al. | Mar. 7, 1950 |

FOREIGN PATENTS

| | | |
|---|---|---|
| 505,629 | Great Britain | May 11, 1939 |
| 519,267 | Great Britain | Mar. 20, 1940 |
| 564,928 | Great Britain | Oct. 19, 1944 |